United States Patent [19]
Shifflet et al.
[11] Patent Number: 4,924,169
[45] Date of Patent: May 8, 1990

[54] CURRENT REGULATOR FOR A BATTERY RE-CHARGING CIRCUIT

[75] Inventors: Glenn Shifflet, Minnetonka; Herbert C. Johnson, Minneapolis, both of Minn.; Paul W. Revenaugh, Oak Harbor, Ohio

[73] Assignee: Dana Corporation, Toledo, Ohio

[21] Appl. No.: 315,429

[22] Filed: Feb. 24, 1989

Related U.S. Application Data

[62] Division of Ser. No. 134,407, Dec. 17, 1987, Pat. No. 4,838,077.

[51] Int. Cl.[5] .......... H02J 7/00
[52] U.S. Cl. .......... 320/21; 320/32; 320/39
[58] Field of Search .......... 320/21, 39, 40, 32

[56] References Cited

U.S. PATENT DOCUMENTS 4,472,672 9/1984 Pacholok .......... 320/21
4,656,411 4/1987 Carlson .......... 320/21 X

OTHER PUBLICATIONS

*Elektor* (Mag), "PWM Battery Charger", Dhingra, 8/1980, pp. 7-18.

*Primary Examiner*—R. J. Hickey
*Attorney, Agent, or Firm*—MacMillan, Sobanski & Todd

[57] ABSTRACT

A circuit for regulating the amount of electrical re-charging current supplied to a battery is disclosed. The circuit includes a first generator for generating a signal representing the desired amount of the re-charging current, a second generator for generating a signal representing the actual amount of the re-charging current, and a comparator responsive to the desired and actual current signals for controlling the actual amount of the re-charging current to correspond to the desired amount. The desired signal generator includes a plurality of individual current signal sources. Each of the individual current signal sources is separately controlled by a microprocessor to selectively generate individual current signals. All of the individual current signals are summed together to provide the desired current signal.

14 Claims, 7 Drawing Sheets

A → D CONVERTER SUB-CIRCUIT
V(SW)
MICROPROCESSOR
ON
LOVOLT
ADDRESS LATCH
PROGRAM ROM
FIRST RAM
SECOND RAM
V(SB)
WAKE-UP
ON
SHUTDOWN
WAKE-UP SUB-CIRCUIT
POWER REGULATOR SUB-CIRCUIT
POWER SUPPLY SUB-CIRCUIT
$V_S$
LOVOLT

SWITCHING REGULATOR
FULL WAVE RECTIFIER
GENERATOR
PULSE WIDTH MODULATOR
WAKE-UP
AUTO
ON
OFF
V(SW)

CURRENT REGULATOR FOR A BATTERY RE-CHARGING CIRCUIT

This is a divisional of co-pending application Ser. No. 134,407 filed on Dec. 17, 1987, now U.S. Pat. No. 4,838,077.

BACKGROUND OF THE INVENTION

The present invention relates in general to devices which are adapted to monitor the operation of movable mechanical members during use. In particular, the present invention relates to an apparatus and method for collecting and storing data relating to various performance characteristics of a vehicle drive shaft as the shaft is rotated during use over a period of time.

For many years, hollow cylindrical drive shafts have been utilized to transmit rotational power between driving and driven components in many different types of vehicles. Drive shafts of this type are typically disposed beneath the bottom of a chassis or frame of the vehicle and, therefore, are exposed to a harsh environment. Frequently, such drive shafts are subjected to relatively large torsional and other stresses of varying magnitudes during normal use. Also, they may be driven at rotational speeds of up to 4000 revolutions per minute during normal use. All of these factors (as well as others) must be accounted for when designing the structure of such a drive shaft, so as to insure that the resulting component will not prematurely fatigue and fail during use. At the same time, it is important not to over-design the drive shaft to have an expected service life which extends long beyond the expected service life of the vehicle itself. Such an over-designed drive shaft would be wasteful in materials and would add undesirable cost and weight to the vehicle.

When designing vehicle drive shafts, reference can be made to techniques which have proven to be effective in evaluating and improving the design of movable mechanical members in general. One of such techniques involves the collection of data related to some of the performance characteristics of the movable member while it is actually in use. Such data acquisition typically entails the sensing of one or more predetermined parameters related to the structure and operation of the movable member. The sensed data is typically collected over a period of time and stored. When a sufficient amount of data has been sensed and stored, it may be evaluated to generate information related to the sufficiency of the design of the movable member. For example, data acquired in this manner can be useful in determining the life span of the movable member, points of anticipated fatigue or failure on the movable member, the amount of usage of the movable member, and other performance information. Unfortunately, because of the location and nature of use of drive shafts within vehicles, it has not been readily possible to collect real time data related to the operation thereof while the drive shaft is in use on the vehicle. Accordingly, it would be desirable to provide an apparatus and method for gathering such data in this manner.

SUMMARY OF THE INVENTION

The present invention relates to an apparatus and method for monitoring the operation of a hollow cylindrical shaft, such as a vehicle drive shaft, during use in order to collect real time data related to certain performance characteristics thereof over a period of time. The collected data may be stored and subsequently evaluated to generate information regarding such performance characteristics or the sufficiency of the design thereof. The data acquisition instrument is generally cylindrical in shape and is adapted to be inserted and retained within the hollow cylindrical drive shaft. A first end of the instrument is sized to fit snugly within a hollow cylindrical end portion of a yoke secured to one end of the drive shaft. A second end of the instrument includes an annular elastomeric retainer having a relaxed outer diameter which is slightly smaller than the inner diameter of the drive shaft. Means are provided for axially compressing the elastomeric retainer after the instrument is inserted within the drive shaft so as to expand the elastomeric retainer radially outwardly into frictional engagement with the inner surface of the drive shaft. As a result, the second end of the instrument is supported within the drive shaft, and the instrument is restrained from axial movement therein.

A generator is mounted within the instrument for rotation therewith. The generator includes an output shaft which is rotatable relative thereto. A pendulum is attached to the output shaft so as to hang downwardly therefrom. When the drive shaft is rotated, as would occur during use of the vehicle, the instrument and the generator rotate therewith. However, the pendulum and the output shaft do not rotate with the generator because of the force of gravity. Consequently, the generator generates an analog electrical output signal which is representative of the rotational speed of the generator relative to the pendulum and, thus, the rotational speed of the drive shaft. A strain gauge is attached to the outer surface of the drive shaft. The strain gauge generates an analog electrical output signal which is representative of the torsional stress created within the drive shaft during use. A temperature sensor provided within the instrument generates an analog electrical output signal which is representative of the ambient temperature therein.

All of these output signals are fed to a control circuit disposed within the instrument. The control circuit includes a microprocessor for regulating the operation of several sub-circuits within the control circuit. An analog to digital converter sub-circuit is provided within the control circuit to convert each of the analog electrical output signals described above to digital signals. The microprocessor selectively interrogates each of the digital signals and stores the data represented thereby. The control circuit also includes a power supply sub-circuit for supplying electrical power to the various components thereof. The power supply sub-circuit includes a plurality of re-chargeable batteries for maintaining the supply of electrical power to the control circuit when the drive shaft is not rotated during use. Means are provided for re-charging the batteries when the drive shaft is rotated. The control circuit further includes a power regulator sub-circuit for regulating the electrical power supplied to most of the components of the control circuit. Lastly, the control circuit includes a wake-up sub-circuit which generates an electrical output signal to the microprocessor when the drive shaft is rotated. So long as the drive shaft is rotated, the microprocessor maintains the control circuit in an active operating condition, whereby the data is sensed and stored as described above. However, when the drive shaft is not rotated for longer than a predetermined period of time, the microprocessor places the control circuit in a stand-by operating condition. In its stand-by operating condition, the control circuit supplies electrical power only to certain components therein to conserve energy consumption. These components include the wake-up sub-circuit and the volatile memory utilized to store the previously collected data.

It is an object of the present invention to provide an apparatus and method for monitoring the operation of a hollow cylindrical shaft, such as a vehicle drive shaft, while it is being used and for collecting and storing data related to such operation over a period of time.

It is another object of the present invention to provide such a data acquisition instrument which is quickly and easily inserted and retained within the drive shaft.

It is a further object of the present invention to provide such a data acquisition instrument which operates in an active operating condition when the drive shaft is in use and which automatically switches to a stand-by operating condition when the vehicle is not in use.

Other objects and advantages of the present invention will become apparent to those skilled in the art from the following detailed description of the preferred embodiment, when read in light of the accompanying drawings.

DETAILED DESCRIPTION OF THE PREFERRED EMBODIMENT

Mechanical Components

Figure 1:
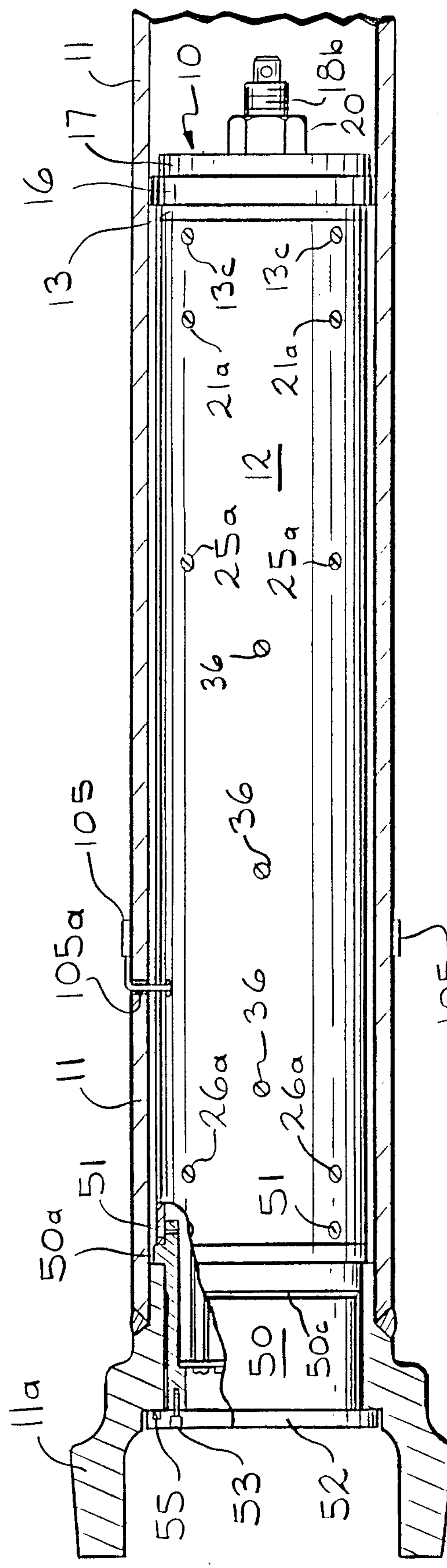
FIG. 1 is a sectional side elevational view of a hollow cylindrical vehicle drive shaft having a data acquisition instrument in accordance with the present invention installed therein.
Figure 2:
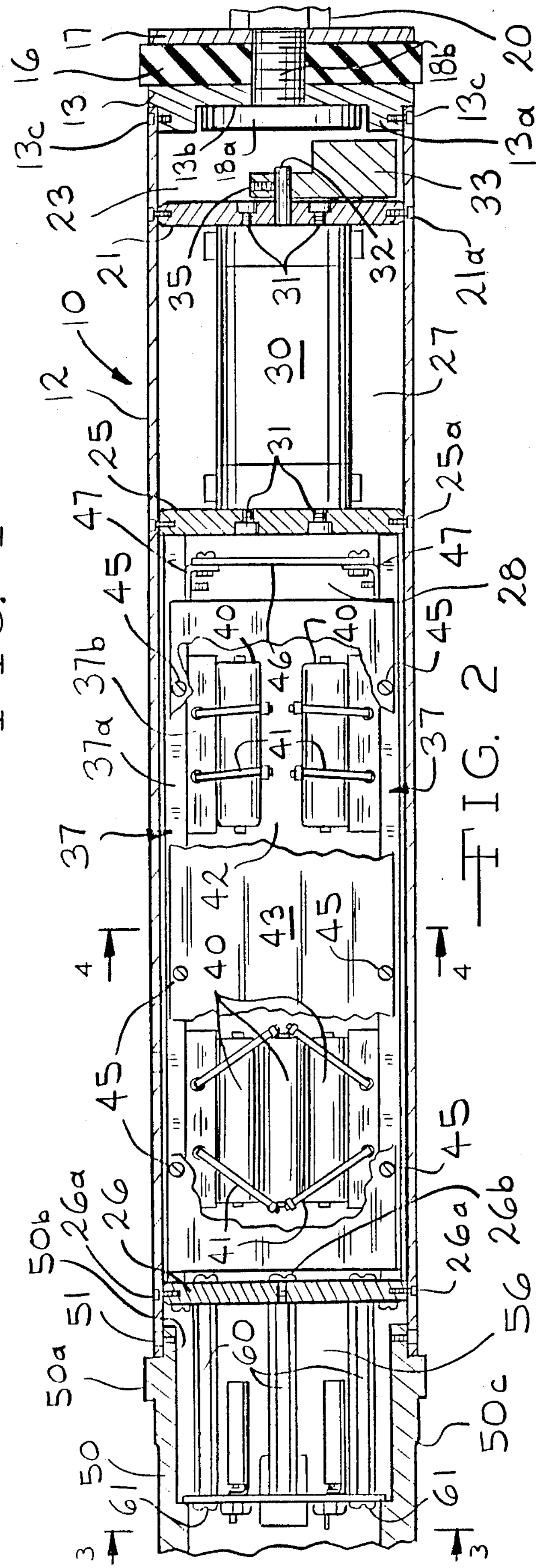
FIG. 2 is a sectional side elevational view of the data acquisition instrument illustrated in FIG. 1.

Referring now to the drawings, there is illustrated in FIGS. 1 and 2 a data acquisition instrument, indicated generally at 10, in accordance with the present invention. The instrument 10 is disposed within a hollow cylindrical shaft 11 in a manner described in detail below. The shaft 11 may be utilized in any desired manner for transmitting power from a driving component to a driven component (neither component being shown in the drawings). However, the preferred environment contemplated by the present invention is for the shaft 11 to function as a conventional drive shaft connected between rotatable driving and driven components in a vehicle. For example, the drive shaft 11 may be connected between a transmission and a differential in a vehicle. In that environment, one or both of the ends of the drive shaft 11 may have a yoke, such as the one shown at 11*a*, welded or otherwise secured thereto to permit such connection. The instrument 10 and the drive shaft 11 define longitudinal axes of rotation which are co-axial.

The instrument 10 includes a hollow cylindrical housing 12 which is open at both ends. The housing 12 has an outer diameter which is smaller than the inner diameter of the drive shaft 11. The housing 12 protectively encloses most of the components of the instrument 10 therein. One end (the right end when viewing FIGS. 1 and 2) is closed by an annular end cap 13. The main body of the end cap 13 has an outer diameter which is equal to the outer diameter of the housing 12. Thus, a flush outer circumferential surface is formed at the junction thereof. The inner diameter of the main body of the end cap 13 is smaller than the inner diameter of the housing 12. The end cap 13 includes a relatively short hollow cylindrical protruding portion 13*a* which extends longitudinally from the main body of the end cap 13 into the housing 12. The outer diameter of the protruding portion 13*a* is slightly less than the inner diameter of the housing 12, permitting the end cap 13 to be journalled therein as shown in FIG. 2. The inner diameter of the protruding portion 13*a* is enlarged through to the innermost end thereof so as to define a recessed area 13*b*. The recessed area 13*b* faces away from the right end of the housing 12 into the interior thereof. A plurality of radially extending threaded fasteners 13*c* extend through the housing 12 into threaded engagement with the protruding portion 13*a* of the end cap 13 so as to attach it to the housing 12. When so attached, the end cap 13 prevents dirt and other contaminants from entering into the right end of the housing 12.

An annular elastomeric retainer 16 is disposed adjacent to the outer end surface of the end cap 13. The elastomeric retainer 16 has a relaxed outer diameter which is slightly smaller than the inner diameter of the drive shaft 11. An annular metallic washer 17 is disposed adjacent to the outer end surface of the elastomeric retainer 16. The washer 17 has an outer diameter which is approximately equal to the outer diameter of the housing 12. The inner diameters of the elastomeric retainer 16 and the washer 17 are approximately equal to the inner diameter of the main body of the end cap 13. The inner diameters of the end cap 13, the elastomeric retainer 16, and the washer 17 together define a passageway which extends axially outwardly from the recessed area 13*b* of the end cap 13 to the exterior of the instrument 10. A T-bolt is provided having an enlarged diameter head portion 18*a* and a threaded shank portion 18*b*. The head portion 18*a* is disposed in the recessed area 13*b*, while the shank portion 18*b* extends through the passageway defined through the end cap 13, the elastomeric retainer 16, and the washer 17 to the exterior of the instrument 10. A nut 20 is threaded onto the shank portion 18*b* of the T-bolt so as to retain the elastomeric retainer 16 and the washer 17 adjacent to the end cap 13. The function of the elastomeric retainer 16 will be explained in detail below.

A first bulkhead 21 is attached to the interior of the housing 12 by means of a plurality of radially extending threaded fasteners 21*a*. The first bulkhead 21 is formed from an annular metal disk having an outer diameter which is slightly less than the inner diameter of the housing 12. A central aperture is formed through the first bulkhead 21. The first bulkhead 21 is spaced apart from the end cap 13 so as to define a first internal chamber 23 within the housing 12. Similarly, second and third bulkheads 25 and 26, respectively, are attached to the interior of the housing 12 by respective pluralities of radially extending threaded fasteners 25*a* and 26*a*. The second bulkhead 25 is spaced apart from the first bulkhead 21 so as to define a second internal chamber 27, while the third bulkhead 26 is spaced apart from the second bulkhead 25 so as to define a third internal chamber 28. The bulkheads 21, 25, and 26 are provided to support the various components of the instrument 10 within the internal chambers 23, 27, and 28 of the housing 12.

An electrical generator 30 is disposed within the second internal chamber 27. The structure of the generator 30 itself is conventional in the art. The generator 30 is attached to the first and second bulkheads 21 and 25, respectively, by a plurality of axially extending threaded fasteners 31. The generator 30 is mounted such that it is balanced for rotation about the longitudinal axes of the instrument 10 and the drive shaft 11. A shaft 32 extends longitudinally outwardly from the generator 30. The shaft 32 extends through the central aperture of the first bulkhead 21 into the first chamber 23. A pendulum 33 is disposed in the first chamber 23 and is attached to the shaft 32 by means of a threaded fastener 35. The shaft 32 and the pendulum 33 are rotatable relative to the generator 30. As will be explained in greater detail below, the shaft 32 and the pendulum 33 are rotated relative to the generator 30 to cause the generator 30 to generate an analog electrical output signal. The magnitude of this output signal is representative of the speed of such relative rotation, while the polarity thereof is representative of the direction of such rotation.

Figure 4:
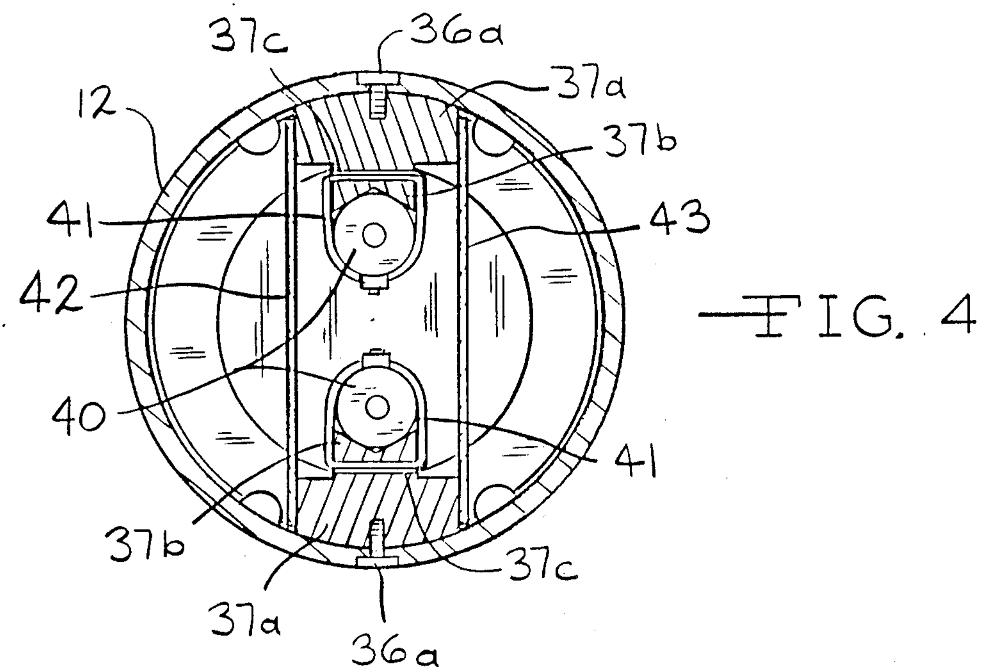
FIG. 4 is a sectional end elevational view taken along line 4—4 of FIG. 2.

A pair of mounting brackets, indicated generally at 37, are retained in the third internal chamber 28 by a plurality of radially extending threaded fasteners 36. The mounting brackets 37 are identical in construction and are arranged in opposed fashion within the housing 12. As best shown in FIG. 4, each of the mounting brackets 37 includes a radially outermost base portion 37*a* and a radially innermost support portion 37*b*. Each of the base portions 37*a* includes a curved outer radial surface which conforms to and is disposed adjacent the curved inner surface of the housing 12. The base portions 37*a* extend longitudinally between the second and third bulkheads 25 and 26. The support portions 37*b* of the mounting brackets are formed integrally with their respective base portions 37*a* and, as mentioned above, extend radially inwardly therefrom. The support portions 37*b* each terminate in an end portion having a generally V-shaped cross section, as best shown in FIG. 4. The V-shaped end portions face toward one another in opposed fashion. A plurality of apertures 37*c* may be formed through each of the support portions 37*b*. The apertures 37*c* may be oriented in a direction which is perpendicular to the longitudinal axes of the instrument 10 and the drive shaft 11.

A plurality of batteries 40 is provided to supply electrical energy to a control circuit (indicated generally at 70 in FIG. 5) of the instrument 10. The structure and operation of the control circuit 70 will be described in detail below. The batteries 40 are adapted to be cradled in the V-shaped end portions of each of the support portions 37*b* of the mounting brackets 37. The batteries 40 are retained in the V-shaped end portions by conventional plastic ties 41. Each of the ties 41 extends through a respective one of the apertures 37*c* and about one or more of the batteries 40 so as to secure the such batteries 40 to the mounting brackets 37, as best shown in FIGS. 2 and 4. Other means may be utilized to support and retain the batteries 40 within the housing 12.

A pair of printed circuit boards 42 and 43 are also retained in the third chamber 28. The printed circuit boards 42 and 43 are generally rectangular and planar in shape. The printed circuit boards 42 and 43 extend parallel to the longitudinal axis of the housing 12 and across the interior of the housing 12 on opposite sides of the mounting brackets 37 and the batteries 40, as best shown in FIG. 4. The edges of the printed circuit boards 42 and 43 are attached to the base portions 37*a* of the mounting brackets 37 by a plurality of threaded fasteners 45. The printed circuit boards 42 and 43 carry the various components of the control circuit 70 which, as previously mentioned, will be described in detail below.

A switch mounting board 46 is also disposed within the third chamber 28. The switch mounting board 46 is generally circular and planar in shape. A pair of L-shaped brackets 47 are provided to connect the switch mounting board 46 to the opposed base portions 37*a* of the mounting brackets 37. As a result, the switch mounting board 46 is supported parallel to and spaced apart from the second bulkhead 25. The switch mounting board 46 carries certain components which are adapted to sense rotational movement of the instrument 10 and the drive shaft 11 and generate electrical signals in response thereto. The structure and operation of the components of the switch mounting board 46 will be described below in conjunction with the description of the control circuit 70.

An adapter 50 is provided to close the other end (the left end when viewing FIGS. 1 and 2) of the housing 12. The main body of the adapter 50 is generally hollow and cylindrical in shape and includes an annular raised stop portion 50*a* formed about the outer circumferential surface thereof. A relatively short journal portion 50*b* of the adapter 50 extends axially from the stop portion 50*a* into the interior of the housing 12. The outer diameter of the journal portion 50*b* is slightly smaller than the inner diameter of the housing 12 such that the journal portion 50*b* may be inserted telescopically within the housing 12. To install the adapter 50 on the housing 12, the journal portion 50*b* is inserted within the open end of the housing 12 and moved axially until the stop portion 50*a* engages the left open end of the housing 12. A plurality of radially extending threaded fasteners 51 (only one is illustrated) may then be utilized to attach the adapter 50 to the housing 12.

The main body of the adapter 50 extends axially outwardly from the stop portion 50*a* toward the yoke 11*a*. The outer surface of the main body of the adapter 50 adjacent to the stop portion 50*a* is sized to fit snugly within a hollow cylindrical end portion formed through the yoke 11*a* so as to support the adapter 50 (and the left end of the instrument 10 attached thereto) therein. As the outer surface of the main body of the adapter 50 extends further outwardly toward the yoke 11*a*, a radially inwardly tapered portion 50*c* is formed circumferentially thereabout. Thus, a reduced diameter portion is provided on the left end of the main body of the adapter 50. This reduced diameter portion extends further axially outwardly from the tapered portion 50*c* and terminates at an open end disposed within the yoke 11*a*. A circular end plate 52 is secured to the opened end of the adapter 50 by a plurality of axially extending threaded fasteners 53 (only one is illustrated). The end plate 52 closes open end of the adapter 50 and, thus, prevents the entry of dirt or other contaminants into the housing 12. An O-ring 55 may be retained in a circumferential groove formed in the end plate 52 so as to provide a fluid tight seal. The outer diameter of the end plate 52 is larger than the inner diameter of the hollow end portion of the yoke 11*a* such that the yoke 11*a* is secured to the adapter 50 between the stop portion 50*a* and the end plate 52 when the end plate 52 is secured to the opened end of the adapter 50.

Figure 3:
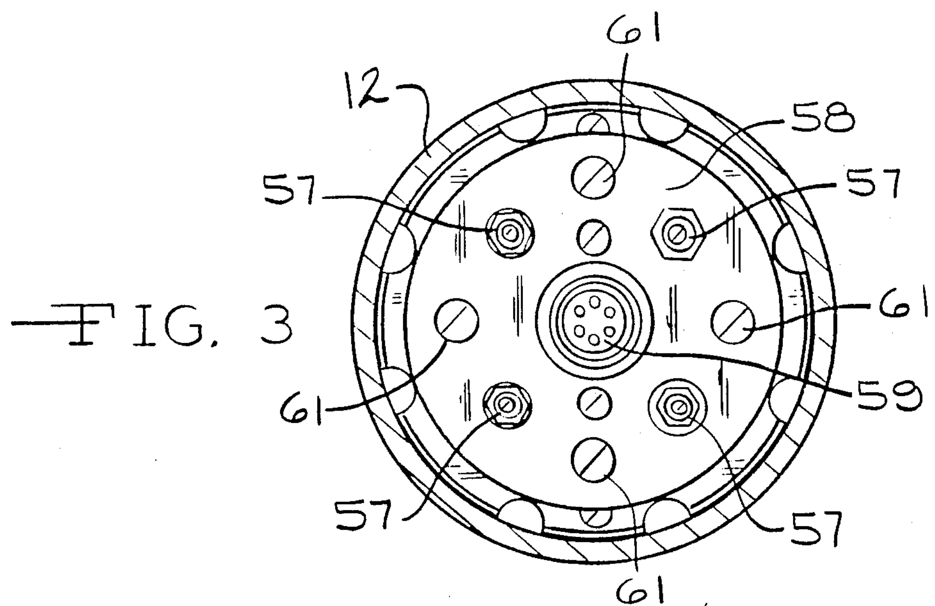
FIG. 3 is a sectional end elevational view taken along line 3—3 of FIG. 2.

The interior of the adapter 50 extending between the third bulkhead 26 and the end plate 52 defines a fourth internal chamber 56 within the instrument 10. A plurality of electrical switches 57 (see FIG. 3) are mounted on a switch bulkhead 58 disposed within the fourth internal chamber 56. Also, a cable connector 59 is mounted on the switch bulkhead 58. The switches 57 are connected through respective electrical conductors (not shown) to the control circuit 70. At least one of the switches 57 may be utilized to manually adjust the operating condition of the control circuit 70, as will be described in detail below. The other switches 57 may be utilized for other conventional purposes. The cable connector 59 is also connected through an electrical conductor (not shown) to the control circuit 70. The cable connector 59 provides a path for the transmission of data to and from the control circuit 70, also as will be described in detail below. The switch bulkhead 58 is attached to the first ends of a plurality of elongated spacers 60 by a plurality of axially extending threaded fasteners 61. The second ends of the spacers 60 are attached to the third bulkhead 26 by a plurality of axially extending threaded fasteners 26*b*.

The installation and operation of the mechanical portion of the instrument 10 thus far described will now be explained. Before installing the instrument 10 within the drive shaft 11, the end cap 13, the elastomeric retainer 16, and the washer 17 are first secured to the right end of the housing 12 as described above. The nut 20 is only loosely tightened on the T-bolt shank 18*b* so as not to significantly compress the elastomeric washer 16. The adapter 50 is then secured to the other end of the housing 12 by the threaded fasteners 51. The instrument 10 is then disposed within the drive shaft 11 by inserting the adapter 50 telescopically through the right open end (not shown) of the drive shaft 11 (which is opposite to the left end of the drive shaft 11 to which the yoke 11*a* is attached). The instrument 10 is moved longitudinally through the drive shaft 11 toward the yoke 11*a* such that the adapter 50 is inserted within the hollow end portion of the yoke 11*a*. Such movement is continued until the stop portion 50*a* of the adapter 50 engages the open end of the yoke 11*a*, as shown in FIG. 1. The tapered portion 50*c* of the adapter 50 aids in smoothly guiding the adapter 50 into the hollow cylindrical end portion of the yoke 11*a*. Lastly, the end cap 52 is secured to the adapter 50 by the threaded fasteners 53, also as described above.

When the stop portion 50*a* engages the open end of the yoke 11*a*, the instrument 10 is properly positioned within the drive shaft 11. At that time, the nut 20 is rotated relative to the T-bolt shank 18*b* so as to axially compress the elastomeric washer 16 between the end cap 13 and the washer 17. Such compression causes the elastomeric washer 16 to expand radially outwardly into frictional engagement with the circumferential inner surface of the drive shaft 11. Such frictional engagement firmly supports the instrument 10 within the drive shaft 11 and prevents any relative movement from occurring therebetween. In this manner, the instrument 10 is retained within the drive shaft 11 for rotation therewith during use.

As mentioned above, the drive shaft 11 is adapted to be rotatably driven during use of the vehicle. As best shown in FIG. 2, the pendulum 33 is supported within the first chamber 23 for rotation relative to the generator 30, consequently, the instrument 10 and the drive shaft 11. The pendulum 33 hangs freely downwardly under the influence of gravity. When the instrument 10 and the drive shaft 11 are rotated during use, the pendulum 33 continues to hang downwardly under the influence of gravity (and its own inertia) and does not rotate. It can be seen, therefore, that the instrument 10 (including the generator 30) is rotated relative to the stationary (i.e., non-rotating) pendulum 33 when the drive shaft 11 is rotatably driven. However, from the point of view of the instrument 10, it appears that the pendulum 33 is rotating relative to the instrument 10. In any event, the speed of such relative rotation is, of course, equal to the rotational speed of the drive shaft 11. Such rotational movement causes the shaft 32 to rotate relative to the generator 30. In response thereto, the generator 30 generates an analog electrical output signal. The magnitude of the output signal is proportional to such relative rotational speed, while the polarity thereof is determined by the direction of such rotation. The electrical output signal is fed to the control circuit 70 of the instrument 10 for a purpose which will be explained in detail below.

Control Circuit 70

Figure 5:
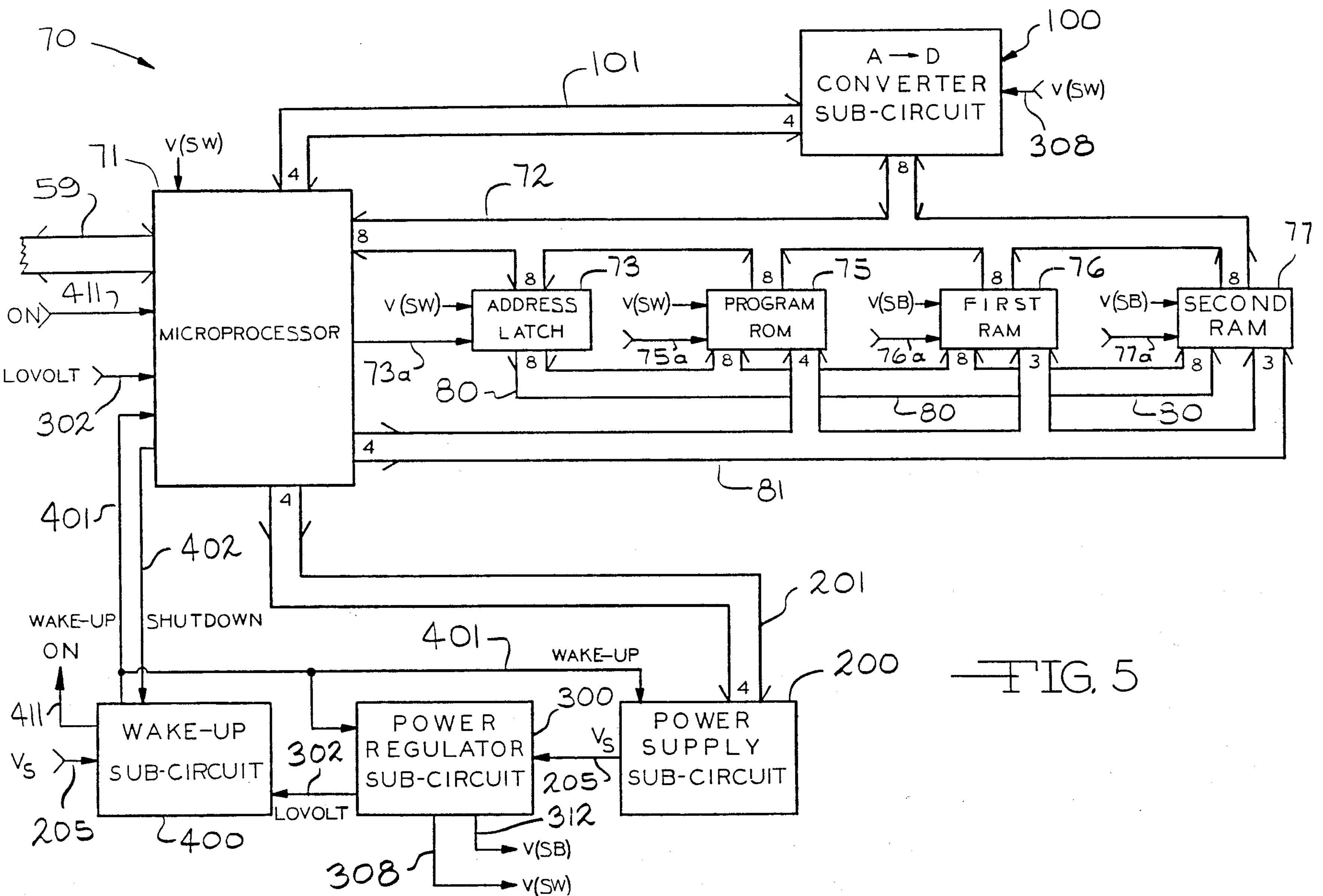
FIG. 5 is a schematic block diagram of a control circuit for the data acquisition instrument illustrated in FIG. 1.

Referring now to FIG. 5, there is illustrated a schematic block diagram of the control circuit, indicated generally at 70, in accordance with the present invention. The control circuit 70 includes a microprocessor 71 which regulates the various operations of the control circuit 70. The electrical conductors in the cable connector 59 are connected to respective serial input and output ports of the microprocessor 71, through which an external computer (not shown) or other device may send data thereto or receive data therefrom in a known manner. The microprocessor 71 is also provided with an eight bit bi-directional data port, through which the rest of the components of the control circuit 70 may send data to or receive data from the microprocessor 71. An eight bit data bus 72 is connected to the eight bit data port of the microprocessor 71. The data bus 72 is connected to an eight bit input port of an address latch 73, an eight bit output port of a program read only memory (ROM) 75, an eight bit output port of a first random access memory (RAM) 76, and an eight bit output port of a second RAM 77. Respective control lines 73*a*, 75*a*, 76*a*, and 77*a* are connected between the microprocessor 71 and the address latch 73, the program ROM 75, the first RAM 76, and the second RAM 77. The control lines 73*a*, 75*a*, 76*a*, and 77*a* permit the microprocessor 71 to selectively control the operations of the respective components connected thereto in a manner which will be described below.

The address latch 73 is provided with an eight bit output port which is connected to an eight line address bus 80. The address bus 80 is connected to eight inputs of a twelve bit input port of the program ROM 75. The address bus 80 is also connected to eight inputs of an eleven bit input port of both the first RAM 76 and the second RAM 77. The microprocessor 71 is further provided with a four bit address port, from which additional data may be sent from the microprocessor 71. A four line microprocessor bus 81 is connected to this address port. The four lines in the microprocessor bus 81 are connected to the remaining four inputs of the twelve bit input port of the program ROM 75. Three of the four lines in the microprocessor bus 81 are connected to the remaining three inputs of the eleven bit input ports of both the first RAM 76 and the second RAM 77.

The operation of the microprocessor 71 is controlled by a computer program which is stored in the program ROM 75. The program ROM is a non-volatile type of memory, wherein a supply of electrical power is not required to maintain the storage of the computer program therein. Thus, as will be further described below, the control circuit 70 may place itself in a stand-by or dormant operating condition such that electrical power is not supplied to the program ROM 75. During such periods of stand-by operation, the computer program for operating the microprocessor 71 is maintained in the program ROM 75. When the control circuit 70 subsequently places itself in an active operating condition, the contents of the program ROM 75 are available to the microprocessor 71.

Although any convenient size may be selected for the program ROM 75, the present invention will be described in the context of a 4Kx8 capacity program ROM 75. In other words, the program ROM 75 has the capacity to store 4,096 bytes therein, each byte having a length of eight bits. A twelve bit address is required to define the location of each of those bytes within the program ROM 75. Thus, the program ROM 75 is provided with the twelve bit input port and the eight bit output port described above. The microprocessor 71 supplies four bits of the twelve bit address directly to the program ROM 75 through the microprocessor bus 81. The remaining eight bits are supplied from the microprocessor 71 through the address latch 73. When one of the 4,096 bytes stored in the program ROM 75 is addressed through its input port, the eight bit byte stored therein at that address is presented through its output port to the data bus 72 for transmission to the microprocessor 71.

To select one of the eight bit bytes stored in the program ROM 75, the microprocessor 71 initially presents the eight bit portion of the twelve bit address on the data bus 72. At the same time, the address latch 73 is enabled (through the control line 73*a*) to receive and store the eight bit portion, while the program ROM 75, the first RAM 76, and the second RAM 77 are disabled (through the control lines 75*a*, 76*a*, and 77*a*, respectively) to ignore the data on the data bus 72. The microprocessor 71 nexts disables the address latch 73 from receiving further data, such that the eight bit portion of the address which was presented on the data bus 72 is stored in the address latch 73 and, therefore, is presented on the address bus 80 to eight of the twelve address inputs of the program ROM 75. At the same time, the microprocessor 71 presents the remaining four bits of the twelve bit address on the microprocessor bus 81 to the remaining four address inputs of the program ROM 75. The program ROM 75 is then enabled by the microprocessor 71 to receive the entire twelve bit address through its input port. In response thereto, the byte stored in the program ROM 75 at the selected address is presented on the data bus 72 for transmission to the microprocessor 71. In a similar manner, the microprocessor 71 transmits and receives information to and from the first RAM 76 and the second RAM 77. While the program ROM 75 is utilized to provide the operating software to the microprocessor 71, the first RAM 76 and the second RAM 77 are utilized to store data which is accumulated by the microprocessor 71 pursuant to the instructions contained in such software, as will be explained below.

The data bus 72 is also connected to an eight bit port of an analog to digital converter sub-circuit, indicated generally at 100. A plurality of control lines, indicated as a converter control bus 101, are connected between the microprocessor 71 and the converter sub-circuit 100. The data bus 72 and the converter control bus 101 permit the microprocessor 71 to regulate the operation of the converter sub-circuit 100, as will be described below. Similarly, a power supply sub-circuit, indicated generally at 200, is provided to supply electrical power to the control circuit 70. The operation of power supply sub-circuit 200 is controlled by the microprocessor 71 through a power supply control bus 201. A power regulator sub-circuit, indicated generally at 300, is also provided in the control circuit 70. The power regulator sub-circuit 300 receives electrical power from the power supply sub-circuit 200 and supplies regulated electrical power to many of the individual components of the control circuit 70. Lastly, a wake-up sub-circuit, indicated generally at 400, is connected to the microprocessor 71. The wake-up sub-circuit 400 is provided to sense when the drive shaft 11 is rotated. When such rotation is sensed, a signal is generated on a WAKE-UP line 401 to the power supply sub-circuit 200, the power regulator sub-circuit 300, and to the microprocessor 71. The microprocessor 71 is connected to the wake-up sub-circuit 400 by a SHUTDOWN line 402, for a purpose which will be described in detail below.

Analog To Digital Sub-Circuit 100

Figure 6:
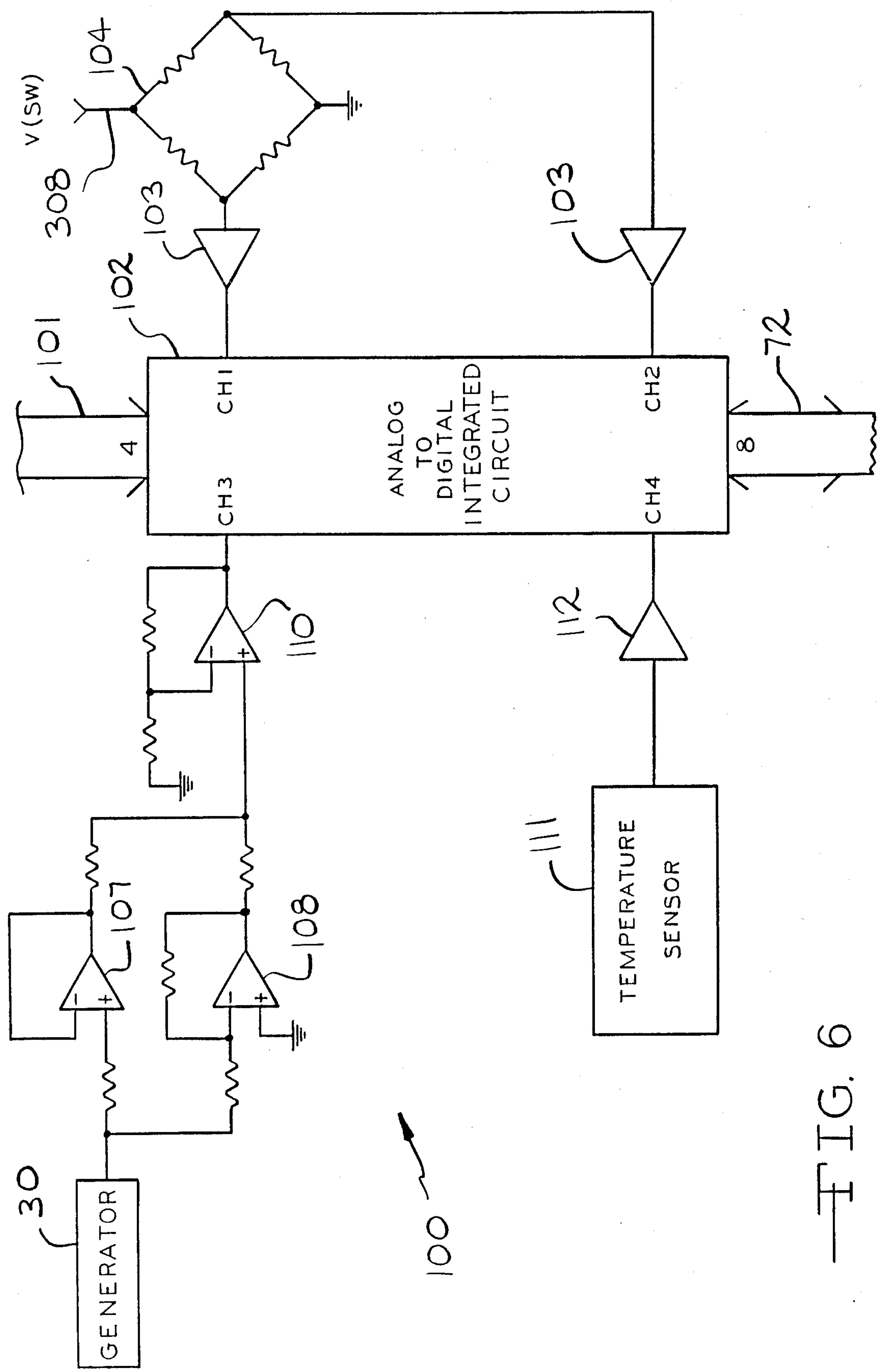
FIG. 6 is a schematic circuit diagram of an analog to digital converter sub-circuit of the control circuit illustrated in FIG. 5.

Referring now to FIG. 6 the structure and operation of the analog to digital converter sub-circuit 100 will be explained. The converter sub-circuit 100 includes a conventional analog to digital integrated circuit 102. The integrated circuit 102 includes a plurality of control inputs and outputs which are connected through the converter control bus 101 to the microprocessor 71. Additionally, the data bus 72 is connected to a port of the integrated circuit 102. As will be explained in greater detail below, the signals generated by the microprocessor 71 to the integrated circuit 102 over the converter control bus 101 and the data bus 72 determine the mode of operation thereof. The integrated circuit 102 also includes an eight bit data port which is connected to the data bus 72.

In the illustrated embodiment, the integrated circuit 102 has four input channels thereto. In other words, the integrated circuit 102 is adapted to receive up to four different analog electrical signals for conversion into digital electrical signals. Two of such input channels (indicated as CH1 and CH2 in FIG. 6) are connected through respective conventional amplifiers 103 to the opposed sides of a resistor bridge network 104. The resistor bridge network 104 may be embodied as a plurality of strain gauges 105 (see FIG. 1) secured about the outer circumferential surface of the drive shaft 11 in a conventional manner. The strain gauges 105 are connected to the control circuit 70 through respective electrical conductors 105*a*. When arranged in this manner, the strain gauges 105 permit the measurement of torque present in the drive shaft 11 during use. Such torque causes the effective electrical resistance of the individual resistors which form the resistor bridge network 104 to vary, as is well known in the art.

The resistor bridge network 104 is excited at one end by a switched electrical voltage, indicated as V(SW), and is grounded at the other end. The switched voltage V(SW) is provided from the power regulator sub-circuit 300 over a line 308, as will be described below. As torque is applied to the drive shaft 11 during use, the varying resistances within the resistor bridge circuit 104 cause different analog electrical signals to be generated on the lines connected through the amplifiers 103 to the first and second input channels CH1 and CH2 of the integrated circuit 102. The magnitude of the difference between these signals is representative of the amount of torque present in the drive shaft 11. At predetermined times, the microprocessor 71 generates control signals over the converter control bus 101 and the data bus 72 to the integrated circuit 102. In response thereto, the integrated circuit 102 subtracts the value of the analog signal presented at the CH2 input channel from the value of the analog signal presented at the CH1 input channel, converts this analog difference signal to an eight bit digital difference signal, and presents the digital difference signal back on the data bus 72. Thus, the converter circuit 100 generates a signal to the microprocessor 71 which is representative of the amount of torque present in the drive shaft 11 during use.

A third input channel (indicated as CH3 in FIG. 6) is provided on the integrated circuit 102 to permit the converter circuit 100 to generate a signal which is representative of the rotational speed of the drive shaft 11 during use. The generator 30 is provided for this purpose. As noted above, the generator 30 generates an analog electrical output signal when the drive shaft 11 is rotated. The magnitude of the output signal from the generator 30 is proportional to the speed of rotation of the drive shaft 11, while the polarity of such signal is dependent upon which direction the drive shaft 11 is rotated (clockwise or counter-clockwise).

For the purpose of generating a signal which is representative of the rotational speed of the drive shaft 11, however, only the magnitude of the output signal from the generator 30 is important. Thus, the output signal from the generator 30 is fed to a pair of operational amplifiers 107 and 108. The first operational amplifier 107 is connected to operate as a unity gain voltage follower, wherein the output voltage therefrom is equal to the input voltage thereto. The second operational amplifier 108 is connected to operate as a unity gain voltage inverter, wherein the output voltage therefrom is equal in magnitude, but opposite in polarity from, the input voltage thereto. Therefore, when the output signal from the generator 30 is a positive voltage (such as would occur when the drive shaft 11 is rotating in a first direction), the first operational amplifier 107 generates a positive output signal of equal magnitude, while the second operational amplifier 108 generates no output signal. When the output signal from the generator 30 is a negative voltage (such as would occur when the drive shaft 11 is rotating in a second direction), the first operational amplifier 107 generates no output signal, while the second operational amplifier 108 generates a positive output signal of equal magnitude.

The outputs from the first and second operational amplifiers 107 and 108 are connected to a third operational amplifier 110. The third operational amplifier 110 is connected to operate as a conventional non-inverting summing amplifier. The analog electrical output signal from the third operational amplifier 110, therefore, is proportional to the rotational speed of the drive shaft 11. This output signal is fed to the third input channel CH3 of the integrated circuit 102. At predetermined times, the microprocessor 71 generates control signals to the integrated circuit 102 over the converter control bus 101 and the data bus 72 which instruct it to convert the value of the analog electrical signal presented at the CH3 input channel to an eight bit digital signal and to present the converted digital signal back on the data bus 72. Thus, the converter circuit 100 generates digital signals to the microprocessor 71 which are representative of the rotational speed of the drive shaft 11 during use.

Lastly, a fourth input channel (indicated as CH4 in FIG. 6) is provided on the integrated circuit 102 to permit the converter circuit 100 to generate digital signals which are representative of the ambient temperature within the drive shaft 11. A conventional temperature sensor 111 is provided in the converter sub-circuit 100 for this purpose. The temperature sensor 111 generates an analog electrical signal which is representative of such ambient temperature. This signal is fed through an amplifier 112 to the fourth input channel CH4 of the integrated circuit 102. At predetermined times, the microprocessor 71 generates control signals to the integrated circuit 102 over the converter control bus 101 and the data bus 72 which instruct it to convert the value of the analog signal presented at the CH4 input channel to an eight bit digital signal and to present the converted digital signal back on the data bus 72. Thus, the converter circuit 100 generates digital signals to the microprocessor 71 which are representative of the ambient temperature within the drive shaft 11 during use.

Power Supply Sub-Circuit 200

Figure 7:
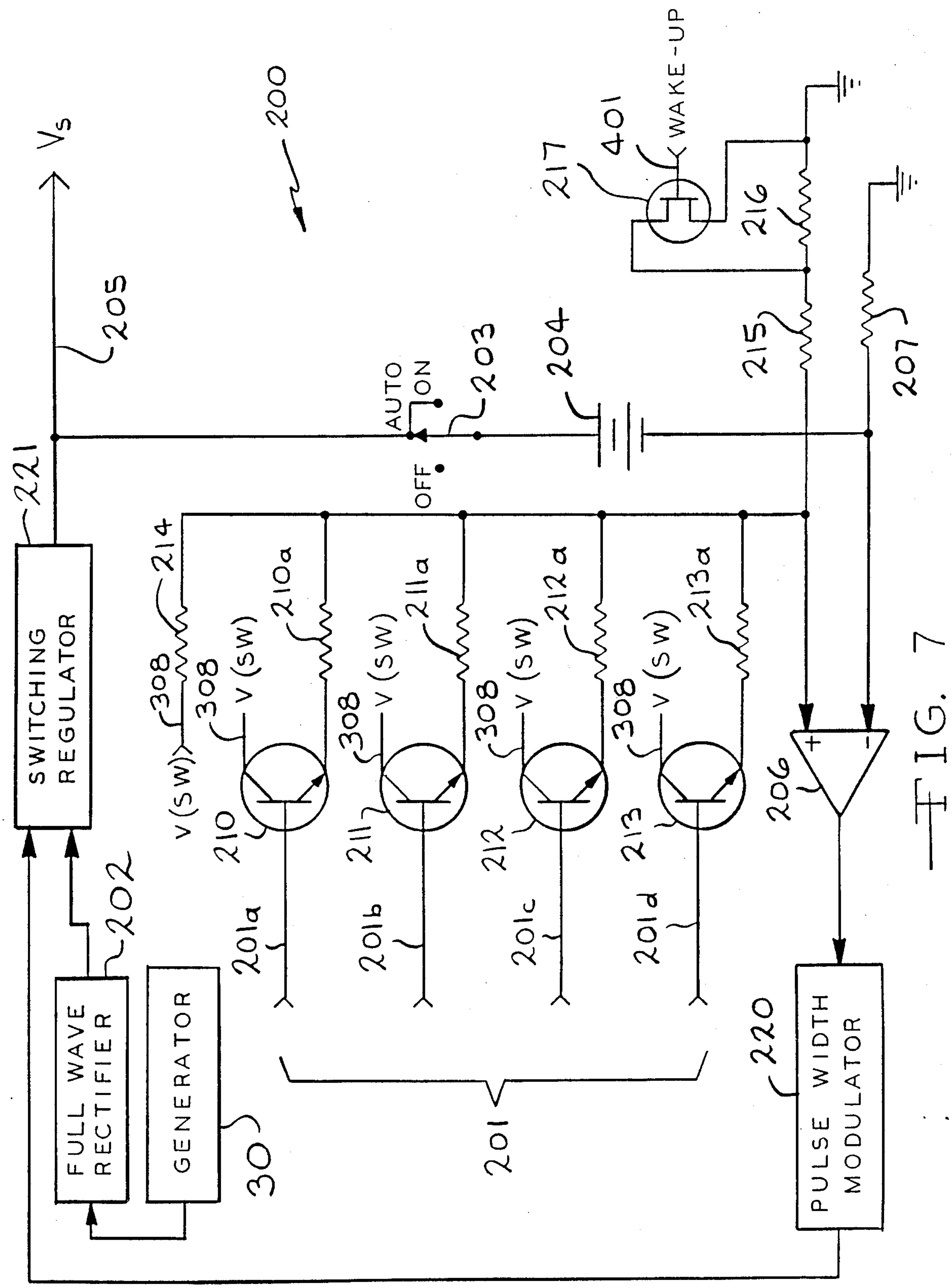
FIG. 7 is a schematic circuit diagram of a power supply sub-circuit of the control circuit illustrated in FIG. 5.

Referring now to FIG. 7, the structure and operation of the power supply sub-circuit 200 will be explained. The analog electrical output signal from the generator 30 forms an input to the power supply sub-circuit 200. As mentioned above, the magnitude of the electrical output signal generated by the generator 30 is representative of the rotational speed of the drive shaft 11. The polarity of such output signal may be positive or negative, depending upon whether the drive shaft 11 is rotated in either a clockwise or counter-clockwise direction. For the purposes of the power supply sub-circuit 200, it does not matter which direction the drive shaft 11 is rotated. What does matter is that the electrical output signal from the generator 30 be rectified to always provide a positive voltage thereto. Thus, the output of the generator 30 is connected to a conventional full wave rectifier 202. The full wave rectifier 202 generates a positive electrical output signal regardless of the direction of rotation of the drive shaft 11. The magnitude of the output signal from the full wave rectifier 202 is still proportional to the rotational speed of the drive shaft 11. The output signal from the full wave rectifier 202 is used in a manner which is described below.

The power supply sub-circuit 200 further includes a single pole, triple throw switch 203. A movable arm of the switch 203 is connected to the positive terminal of a battery pack 204. The battery pack 204 represents the five batteries 40 described above connected in series.

The switch 203 includes "OFF", "AUTO", and "ON" contacts. The "OFF" contact is an open circuit in the power supply sub-circuit 200, while the "ON" contact is connected to the "AUTO" contact by an electrical conductor.

The three poles of the switch 203 define the three operating conditions of the instrument 10. As will be explained in greater detail below, the arm of the switch 203 is set to "ON" when it is desired to continuously operate the instrument 10 in an active operating condition. In this active operating condition, all of the components of the control circuit are energized with their normal operating voltages, regardless of whether or not the drive shaft 11 is rotated. Second, the arm of the switch 203 is set to "AUTO" when it is desired to operate the instrument 10 in a stand-by operation condition. In this stand-by operating condition, the instrument 10 is automatically turned on to the active operating condition only when the drive shaft 11 is rotated. When the drive shaft 11 stops rotating for longer than a certain period of time, the instrument 10 automatically places itself in a dormant or inactive state. In this dormant state, the normal operating voltages supplied to many of the components of the control circuit 70 are temporarily reduced or completely turned off in order to conserve energy consumption. Third, the arm of the switch 203 is set to "OFF" when it is desired to turn the instrument 10 completely off, again regardless of whether the drive shaft 11 is rotating.

An electrical conductor 205 is connected to the "AUTO" contact of the switch 203. When the arm of the switch 203 is connected to either the "AUTO" or "ON" contacts, the positive terminal of the battery pack 204 is connected to the conductor 205. As will be explained in greater detail below, however, the generator 30 also generates electrical energy to the conductor 205 when the drive shaft 11 is rotating. Thus, a constant supply voltage (indicated as Vs) is maintained on the conductor 205 when the arm of the switch 203 is connected to either the "AUTO" or the "ON" contacts. This supply voltage Vs is utilized to supply power to operate the rest of the control circuit 70, as will be described below.

Assuming that the arm of the switch 203 is set to either the "AUTO" or "ON" contacts, the supply voltage Vs is supplied to the rest of the control circuit 70 through the conductor 205. Depending upon the speed of the rotation of the drive shaft 11, such supply voltage Vs will be supplied either by the generator 30 alone, by the battery pack 204 alone, or by a combination of both the generator 30 and the battery pack 204. If the drive shaft 11 is rotating at a relatively fast speed, then the amount of electrical energy generated by the generator 30 will exceed the voltage level of the battery pack 204. In this situation, the generator 30 will supply all of the supply voltage Vs on the conductor 205. The level of such supply voltage Vs will remain constant at the voltage level of the battery pack 204. Any excess electrical energy generated by the generator 30 causes a current to flow backward through the battery pack 204. Consequently, the battery pack 204 can be re-charged in this condition.

On the other hand, if the drive shaft 11 is not rotating at all, the generator 30 does not generate any electrical energy. In this situation, the entire supply voltage Vs must be supplied by the battery pack 204. Lastly, if the drive shaft 11 is rotating at a relatively slow speed, the generator 30 generates electrical energy at a voltage level which is less than the supply voltage Vs. In this situation, both the generator 30 and the battery pack 204 supply a portion of the electrical energy to make up the total supply voltage Vs. Thus, regardless of rotational speed of the drive shaft 11 (or the direction thereof, because of the full wave rectifier 202), the voltage supply Vs is maintained for operating the rest of the control circuit 70, so long as the arm of the switch 203 is connected to either the "AUTO" or the "ON" contacts.

When the generator 30 is generating sufficient electrical energy to re-charge the battery pack 204, it is desirable to provide some means for regulating the amount of the re-charging current supplied to the battery pack 204 in accordance with the ambient temperature thereof. Such re-charging current regulation is necessary to prevent damage to the batteries 40 resulting from excessive re-charging current. The maximum safe re-charging current is dependent the ambient temperature of the batteries 40. To accomplish this re-charging current regulation, the negative terminal of the battery pack 204 is connected to the inverting input of an operational amplifier 206. The negative terminal is also connected through a resistor 207 to ground potential. When the battery pack 204 is being re-charged, the current flowing therethrough also flows through the resistor 207. As a result, a positive voltage is created at the junction between the negative terminal of the battery pack 204 and the resistor 207. This voltage is proportional to the actual amount of the re-charging current passing through the battery pack 204 and is supplied to the inverting input of the operational amplifier 206.

The operational amplifier 206 compares this actual recharging current voltage level with a desired re-charging current voltage level provided at the non-inverting input of the operational amplifier 206 by a current ladder network. The ladder network includes a plurality of NPN transistors 210, 211, 212, and 213, the emitters of which are connected to respective resistors 210*a*, 211*a*, 212*a*, and 213*a*. Each of the collectors of the transistors 210, 211, 212, and 213 is connected to the switched voltage source indicated as V(SW) by the line 308. Each of the bases of the transistors 210, 211, 212, and 213 is connected through a respective individual line 201*a*, 201*b*, 201*c*, and 201*d* contained in the power supply control bus 201 to the microprocessor 71. The ladder network further includes a a relatively large value resistor 214 connected to the switched voltage source V(SW). All of the resistors 210*a*, 211*a*, 212*a*. 213*a*, and 214 are connected in summing fashion to the non-inverting input of the operational amplifier 206.

When the microprocessor 71 generates a positive voltage control signal on one of the individual lines (the first line 201*a*, for example), the corresponding transistor 210 is activated into its conductive state. As a result, the switched voltage source V(SW) is effectively connected to the resistor 210*a*, causing an electrical current to flow therethrough. The amount of such electrical current is dependent upon the value of the resistor 210*a* and the magnitude of the switched voltage source V(SW). Preferably, the values of the resistors 210*a*, 211*a*, 212*a*, and 213*a* differ from one another and may, for example, increase in value by successive multiples of two over a minimum resistance. By selecting the resistor values in this manner, the total amount of current generated by the ladder network can be precisely controlled by the microprocessor 71 through its generation of appropriate control signals to one or more of the transistors 210, 211, 212, and 213. Because the relatively large value resistor 214 is directly connected to the switched voltage V(SW), a constant (though relatively small) amount of current is supplied whenever the instrument 10 is operating in the active operating condition, regardless of the control signals generated by the microprocessor 71 on the power supply control bus 201. Thus, by generating appropriate control signals on the power supply control bus 201, the microprocessor 71 controls the amount of additional current which will be added to the small constant current. The total amount of current from the current ladder network represents the desired re-charging current voltage level.

The junction between the resistors 210*a*, 211*a*, 212*a*, 213*a*, 214 and the non-inverting input of the operational amplifier 206 is connected through a relatively low value resistor 215 and a relatively high value resistor 216 to ground potential. The source and the drain of a field effect transistor (FET) 217 are connected in parallel across the resistor 216. The gate of the FET 217 is connected to the WAKE-UP line 401 which, as mentioned above, originates from the wake-up sub-circuit 400. When the instrument 10 is in the stand-by operating condition, the signal on the WAKE-UP line 401 is low, thereby turning the FET 217 off. As a result, the relatively high value resistor 216 is unaffected by the FET 217. When the instrument 10 is in the active operating condition, the signal on the WAKE-UP line 401 is high, thereby turning the FET 217 on. In this condition, the relatively high value resistor 216 is effectively short circuited by the FET 217.

The program ROM 75 stores data therein relating the desired re-charging current for the batteries 40 to ambient temperature thereof. The microprocessor 71 selectively interrogates the previously mentioned temperature sensor 111 in order to determine the ambient temperature of the batteries 40. In response thereto, the microprocessor 71 generates appropriate control signals to the ladder network described above so as to generate a total current which is equal to the desired re-charging current. When the instrument is in the active operating condition, the FET 217 is turned on, and the current passes through the relatively low value resistor 215 and the virtual short circuit provided by the FET 217. As a result, a positive voltage is generated by the flow of electric current through the low value resistor 215. This positive voltage is supplied to the non-inverting input of the operation amplifier 206 and is representative of the desired re-charging current for the batteries 40 at the present ambient temperature.

As mentioned above, the operational amplifier 206 compares the actual re-charging current voltage level (presented at the inverting input) with the desired re-charging current voltage level for the present ambient temperature (presented at the non-inverting input) in order to regulate the amount of current utilized to re-charge the battery pack 204. The output signal from the operational amplifier 206 is representative of the difference between the actual and desired levels. This output signal is fed to a pulse width modulating circuit 220. The pulse width modulating circuit 220 is conventional in the art and is adapted to generate a pulse train output signal. The time duration of each of the pulses is proportional to the magnitude of the difference signal from the operational amplifier 206.

The output pulses from the pulse width modulator 220 are fed to a switching regulator 221. The output signal from the full wave rectifier 202 is also fed to the switching regulator 220. The switching regulator 221 is conventional in the art and is adapted to generate a regulated output signal therefrom. In this instance, the magnitude of the output signal from the switching regulator 221 is equal to a proportion of the input signal from the full wave rectifier 202 and the generator 30. The amount of this proportion is determined by the length of the output pulses from the pulse width modulator 220 divided by the period between successive pulses, as is known in the art. Since the magnitude of the difference signal from the operational amplifier 206 determines the length of the pulses generated from the pulse width modulator 220, it follows that the magnitude of the output signal from the switching regulator 221 is determined by the difference between the actual re-charging signal and the desired re-charging signal.

When the magnitude of this difference signal is relatively small in magnitude, the actual re-charging current is approximately equal to the desired re-charging current. In response thereto, the output pulses from the pulse width modulator 220 are generated having a predetermined time duration. Thus, the output signal from the full wave rectifier 202 is regulated to a predetermined extent, thereby maintaining the proper re-charging current condition. When the magnitude of the difference signal is relatively large and positive in magnitude, the actual re-charging current is too small in relation to the desired re-charging current. In response thereto, the pulse width modulator 220 increases the time duration of the output pulses therefrom over the predetermined time duration, which results in an increase in the amount of re-charging current supplied from the full wave rectifier 202 to the battery pack 204. Conversely, when the magnitude of the difference signal is relatively large and negative in magnitude, the actual re-charging current is too large in relation to the desired re-charging current. Thus, the pulse width modulator 220 decreases the time duration of the output pulses therefrom below the predetermined time duration, which results in an decrease in the amount of re-charging current supplied from the full wave rectifier 202 to the battery pack 204.

As mentioned above, when the instrument 10 is in the stand-by operating condition, the FET 217 is turned off. In this condition, any current which is generated by the ladder network passes through both the relatively low value resistor 215 and the relatively high value resistor 216. Thus, a very high voltage level is supplied to the noninverting input of the operational amplifier 206 as the desired re-charging current voltage level. In this situation, the difference signal generated by the operational amplifier 206 is very large and positive in magnitude. Consequently, the pulse width modulator 220 greatly increases the time duration of the output pulses therefrom to the point where they do not significantly reduce the amount of output signal from the full wave rectifier 202.

Power Regulator Sub-Circuit 300

Figure 8:
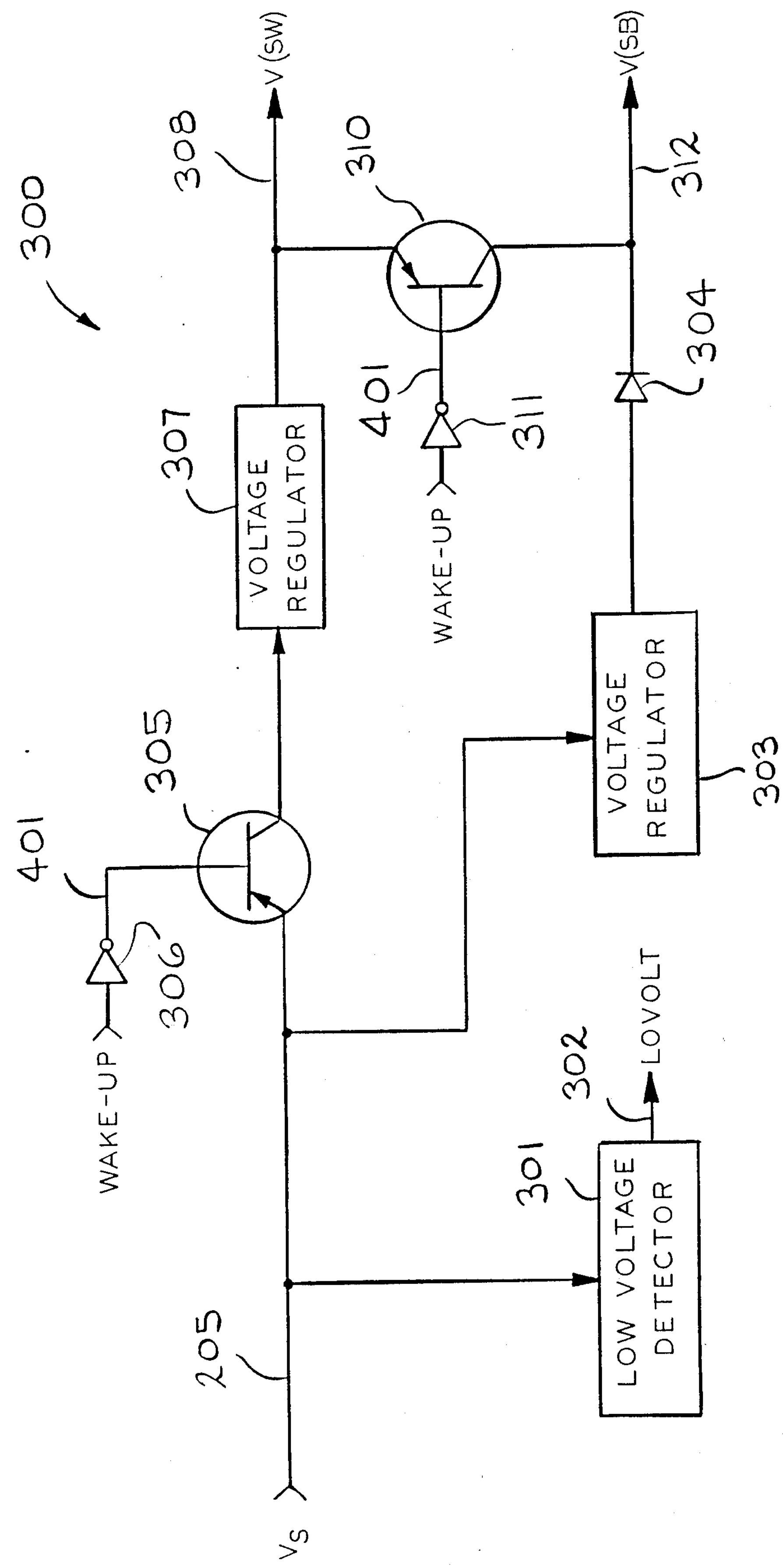
FIG. 8 is a schematic circuit diagram of a power regulator sub-circuit of the control circuit illustrated in FIG. 5.

Referring now to FIG. 8, the structure and operation of the power regulator sub-circuit 300 will be explained. The conductor 205 from the power supply sub-circuit 200 (carrying the supply voltage Vs) provides the main power input to the power regulator sub-circuit 300. The conductor 205 is connected to a low voltage detector 301. The low voltage detector 301 is conventional in the art and is adapted to generate an output signal on a line 302 when the supply voltage Vs on the conductor 205 is less than a predetermined minimum level. This output signal is designated as LOVOLT for convenience. Whenever the supply voltage Vs is greater than this predetermined level, the low voltage detector 301 discontinues generating the LOVOLT output signal. The LOVOLT signal is utilized by the microprocessor 71 and the wake-up sub-circuit 400 in a manner described below.

The conductor 205 carrying the supply voltage Vs is also connected to a first voltage regulator 303. The first voltage regulator 303 is conventional in the art and is adapted to generate a regulated output voltage to the anode of a diode 304. This first regulated voltage is relatively small in magnitude and is preferably somewhat less than the supply voltage Vs, for a reason which will be explained below. For example, the supply voltage Vs may be six volts, while the relatively small regulated voltage from the first voltage regulator 303 and the diode 304 may be two volts.

The conductor 205 carrying the supply voltage Vs is further connected to the emitter of a PNP transistor 305. The base of the transistor 305 is connected through an inverter 306 to the WAKE-UP line 401 from the wake-up sub-circuit 400 described below. When the signal on the WAKE-UP line 401 is high (indicating that the control circuit 70 is in the active operating condition), the transistor 305 is turned on, thereby effectively connecting the conductor 205 to the collector of the transistor 305. When the signal on the WAKE-UP line 401 is low (indicating that the control circuit 70 is in the dormant stand-by operating condition), the transistor 305 is turned off, thereby effectively disconnecting the conductor 205 from the collector of the transistor 305.

The collector of the transistor 305 is connected to a second voltage regulator 307. The second voltage regulator 307 is also conventional in the art and is adapted to generated a regulated output voltage therefrom on the output line 308. This second regulated voltage is relatively large in magnitude with respect to the first regulated voltage, but is still less than the supply voltage Vs. For example, the relatively large regulated voltage from the second voltage regulator 307 may be five volts. However, since the input of the second voltage regulator 307 is only selectively connected to the supply voltage Vs (because of the switching action of the transistor 305), the relatively large regulated voltage from the second voltage regulator 307 is a switched output voltage, indicated as V(SW). The switched voltage V(SW) on the output line 308 is either approximately equal to the relatively large regulated voltage from the second voltage regulator 307 (when the signal on the WAKE-UP line 401 is high, thereby turning the transistor 305 on) or zero (when the signal on the WAKE-UP line 401 is low, thereby turning the transistor 305 off).

The switched voltage V(SW) output line 308 from the second voltage regulator 307 is connected to the emitter of a PNP transistor 310. The base of the transistor 310 is connected through an inverter 311 to the WAKE-UP line 401. The collector of the transistor 310 is connected to an output line 312 from the power regulator sub-circuit 300. The junction between the collector of the transistor 310 and the output line 312 is connected to the cathode of the diode 304. When the signal on the WAKE-UP line 401 is high, both of the transistors 305 and 310 are turned on. Consequently, the switched voltage V(SW) on the output line 308 is the regulated five volt signal, as described above. The same regulated five volt signal is also supplied through the transistor 310 to the output line 312 as the stand-by voltage V(SB). Thus, when the control circuit 70 is in the active operating condition, the switched voltage V(SW) and the stand-by voltage V(SB) are both equal to the relatively large regulated output voltage from the second voltage regulator 307. When the signal on the WAKE-UP line 401 is low, both of the transistors 305 and 310 are turned off. Thus, the switched voltage V(SW) on the output line 308 is zero. However, the regulated two volt signal from the first voltage regulator 303 continues to be supplied through the diode 304 to the output line 312. Thus, when the control circuit 70 is in the dormant or stand-by operating condition, the switched voltage V(SW) is zero and the stand-by voltage V(SB) is equal to the relatively small regulated voltage from the first voltage regulator 303.

It can be seen, therefore, that the power supply sub-circuit 200 and the power regulator sub-circuit 300 generate three different power signals to the rest of the control circuit 70. First, the power supply sub-circuit 200 generates the six volt supply voltage Vs on the line 205 whenever the arm of the switch 203 is connected to either the "AUTO" or "ON" contacts. This supply voltage Vs is constantly provided only to those components of the control circuit 70 which require an uninterrupted supply of power, regardless of operating condition of the instrument 10. Such components include those contained in the wake-up sub-circuit 400, as will be described below.

Second, the power regulator sub-circuit 300 generates the switched voltage V(SW) on the line 308. The switched voltage V(SW) is provided to those components of the control circuit 70 which are utilized only in the active operating condition, including the converter sub-circuit 100, the battery re-charging components of the power supply sub-circuit 200, the address latch 73, and the program ROM 75.

Third, the power regulator sub-circuit 300 generates the stand-by voltage V(SB) on the line 312. The stand-by voltage V(SB) is provided to those components of the control circuit 70 which require an uninterrupted supply of a relatively small regulated voltage in the stand-by operating condition, but which require a relatively large regulated voltage when the control circuit 70 is in the active operating condition. These components include the microprocessor 71, the first RAM 76, and the second RAM 77. The relatively small regulated voltage permits the microprocessor 71 to activate the control circuit 70 from the stand-by operating condition to the active operating condition. The relatively small regulated voltage also provides sufficient power to the first RAM 76 and the second RAM 77 such that the data stored therein is retained when the control circuit 70 is in the stand-by operating condition.

Wake-Up Sub-Circuit 400

Figure 9:
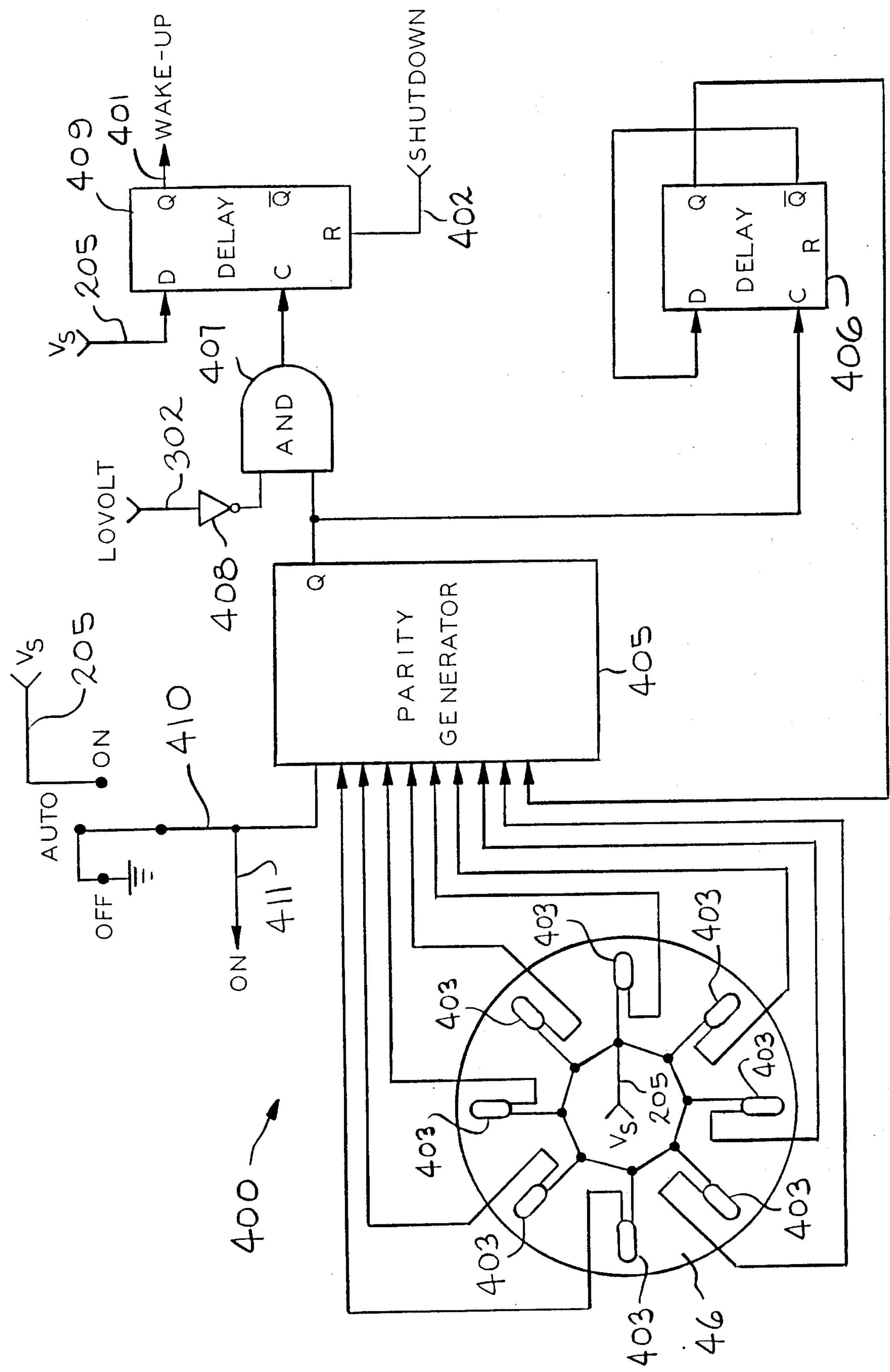
FIG. 9 is a schematic circuit diagram of a wake-up sub-circuit of the control circuit illustrated in FIG. 5.

Referring now to FIG. 9, the structure and operation of the wake-up sub-circuit 400 will be explained. As previously described, the switch board 46 is mounted within the third chamber 28 of the instrument 10 for rotation therewith. Switch means are provided on the switch board for generating an electrical signal when the instrument 10 is rotated. In the illustrated embodiment, the switch means includes a plurality of conventional liquid mercury switches 403. The switches 403 are attached to the switch board 46 in a radially extending array about the axis of rotation of the instrument 10.

Although any convenient number of switches 403 may be utilized, the preferred embodiment contemplates that eight of such switches 403 be provided.

The switches 403 each function as a single pole, single throw electrical switch. To that end, each of the switches 403 includes two internal terminals (not shown). The first terminals of the switches 403 are all connected to the supply voltage Vs on the line 205 from the power supply sub-circuit 200. The second terminals of the switches 403 are connected through respective conductors to a parity generator 405. The operation of the parity generator 405 will be described in detail below. The first and second terminals of each of the switches 403 are electrically connected together whenever the switch 403 is oriented at an angle such that the electrically conductive liquid mercury contained therein covers both of the terminals. When this occurs, the supply voltage Vs is connected to the corresponding input of the parity generator 405. Such supply voltage represents a logical "high" or "one" signal. Similarly, when the switch 403 is oriented at an angle such that the liquid mercury does not cover both of the internal terminals, the supply voltage Vs is disconnected from the corresponding input of the parity generator 405. Such a condition represents a logical "low" or "zero" signal.

The output of the parity generator 405 is connected to the clock input of a conventional first delay flip-flop 406. The non-inverting output of the first delay flip-flop 406 is connected back to one of the inputs of the parity generator 405. The inverting output of the first delay flip-flop 406 is connected to the data input thereof. The output of the parity generator 405 is also connected to a first input of a logic AND gate 407. The line 302 from the voltage regulator sub-circuit 300 carrying the LOVOLT signal is connected through an inverter 408 to a second input of the AND gate 407. The output of the AND gate 407 is connected to the clock input of a second conventional delay flip-flop 409. The data input of the second delay flip-flop 409 is connected to the line 205 from the power supply sub-circuit 200 carrying the supply voltage Vs. The non-inverting output of the second delay flip-flop 409 is connected to the WAKE-UP line 401. A reset input to the second delay flip-flop 409 is connected to the SHUTDOWN line 402 from the microprocessor 71.

A single pole, triple throw switch 410 is also provided in the wake-up sub-circuit 400. The switch 410 includes a movable arm which is connected to one of the inputs of the parity generator 405. The movable arm is also connected to an "ON" line 411 connected to the microprocessor 71. The switch 410 includes three contacts, indicated as "OFF", "AUTO", and "ON", similar to the switch 203 described above in connection with the power supply sub-circuit 200. Preferably, the movable arms of the switches 203 and 410 are ganged such that they move together when one of the electrical switches 57 mounted on the switch bulkhead 58 is manipulated. The "ON" contact is connected through the line 205 to the supply voltage Vs. The "AUTO" and "OFF" contacts are both connected to ground potential. The function of the switch 410 will be described below.

The parity generator 405 is conventional in the art and is adapted to generate a high output signal whenever an odd number of the inputs thereto are high. When the drive shaft 11 has been stationary for a predetermined period of time, the outputs of the parity generator 405 and the second delay flip-flop 409 are low. Subsequent rotation of the drive shaft 11 causes corresponding rotation of the switch board 46 and the switches 403, as mentioned above. If the switch board 46 is rotated in a clockwise direction when viewing FIG. 9, the switches 403 are closed (in the electrical sense) as they descend past approximately the three o'clock position and remain closed until they ascend past approximately the nine o'clock position. As the switches 403 are alternately closed and opened, the number of inputs to the parity generator 405 which are high changes. The parity generator 405 is responsive to such changes for changing the output thereof from low to high when the number of high inputs to the parity generator 405 changes from even to odd. Thus, the output state of the parity generator 405 changes from low to high immediately when the drive shaft 11 begins to rotate.

When the output state of the parity generator 405 changes state from low to high, a high input signal is supplied to the clock input of the first delay flip-flop 406. That clock pulse causes the first delay flip-flop 406 to invert its output state. In other words, if the output state of the first delay flip-flop 406 was previously high, then such output state changes to low immediately upon receipt of the clock pulse from the parity generator 405. Conversely, if the output state of the first delay flip-flop 406 was previously low, then such output state changes to high. This inverting action is caused by the connection of the inverting output of the first delay flip-flop 406 to the data input thereof.

As mentioned above, the output of the first delay flip-flop 406 is connected to one of the inputs of the parity generator 405. Thus, when the output state of the first delay flip-flop 406 changes as described above, the number of inputs to the parity generator 405 is changed back from odd to even. The output state of the parity generator 405, therefore, is quickly changed back to low before further rotation of the switch board 46 causes it to again go high. Thus, it can be seen that the first delay flip-flop 406 permits the parity generator 405 to remain in its high output state for only a very short period of time when one of the switches 403 is closed or opened. This sequence of events is repeated as the switch board 46 continues to rotate. Each time one of the switches 403 is closed or opened and the output state of the parity generator 405 changes from low to high, the first delay flip-flop 406 causes such output state to quickly return from high to low. Thus, the output state of the parity generator 405 has the appearance of a pulse train signal, each of the pulses having a very short time duration, when the drive shaft 11 is rotated.

The output pulses from the parity generator 405 are fed to the input of the AND gate 407. Such output pulses are passed through to the clock input of the second delay flip-flop 409 only if the signal on the LOVOLT line 302 is low. As mentioned above, the signal on the LOVOLT line 302 is low only when the supply voltage Vs from the battery pack 204 is greater than a predetermined minimum level. If it is not, then it would be undesirable to trigger the control circuit 70 into its active mode. Accordingly, the AND gate 407 prevents the output pulses from the parity generator 405 from passing further through the wake-up sub-circuit 400 when the supply voltage Vs from the battery pack 204 is below the predetermined minimum.

Assuming that the supply voltage Vs is greater than the predetermined minimum, the output pulses from the parity generator 405 will be passed through the AND gate 407 to the clock input of the second delay flip-flop 409. The first of such clock pulses causes the output state of the second delay flip-flop 409 to go high, since the data input thereof is connected to the supply voltage Vs by the line 205. Subsequently clock pulses continue to clock the second delay flip-flop 409, but the output state thereof does not change from high, since the data input is constantly connected to the supply voltage Vs. Thus, it can be seen that the output state of the second delay flip-flop 409 changes from low to high when the instrument 10 begins to rotate and remains high as the rotation of the instrument 10 continues. The output state of the second delay flip-flop 409 is reset to low only when the microprocessor 71 generates a reset signal on the SHUTDOWN line 402, as described below.

System Operation

The instrument 10 is initially installed within the drive shaft 11 as described above, and the drive shaft 11 is then installed within a vehicle for use. Once installed, the control circuit 70 of the instrument 10 is activated from the off operating condition to the stand-by operating condition by manipulating one of the electrical switches 57 carried on the switch bulkhead 58. In response thereto, the arm of the switch 203 of the power supply sub-circuit 200 and the arm of the switch 410 of the wake-up sub-circuit 400 are both moved from the respective "OFF" contacts to the respective "AUTO" contacts. Thus, the battery pack 204 is connected to provide the supply voltage Vs on the line 205 to the control circuit 70.

In the stand-by operating condition, the wake-up sub-circuit 400 is fully active because the supply voltage Vs is supplied directly thereto. Consequently, the wake-up sub-circuit 400 constantly monitors the position of the drive shaft 11 in order to generate the high signal on the WAKE-UP line 401 when the drive shaft 11 begins to rotate. However, only the relatively small stand-by voltage V(SB) is provided to the microprocessor 71, the first RAM 76, and the second RAM 77 while the control circuit 70 is in this dormant stand-by operating condition. The remainder of the control circuit 70 (including the converter sub-circuit 100, the re-charging ladder network for the battery pack 204, the address latch 73, and the program ROM 75) is connected to the switched voltage V(SW) and, therefore, is not supplied with any power until the drive shaft 11 begins to rotate.

When the drive shaft 11 is rotated by the vehicle during use, the wake-up sub-circuit 400 generates a high signal on the WAKE-UP line 401 to the microprocessor 71, the FET 217 in the power supply sub-circuit 200, and the transistors 305 and 310 in the power regulator sub-circuit 300. In response thereto, both the switched voltage V(SW) and the stand-by voltage V(SB) are raised to their relatively high levels as described above, thereby activating all of the components of the control circuit 70. The FET 217 is also turned on, thereby permitting the power supply sub-circuit 200 to re-charge the battery pack 204 as necessary.

When the microprocessor 71 receives the high signal on the WAKE-UP line 401, it proceeds through an initialization routine stored in the program ROM 75. Following this, the microprocessor 71 enters into the data acquisition mode. The sensed data from the converter sub-circuit 100 is selectively read by the microprocessor 71 according to another routine stored in the program ROM 75. As described above, the sensed data may include amount of torque applied to the drive shaft 11, the rotational speed of the drive shaft 11, and the ambient temperature within the instrument 10. Data concerning other performance characteristics of the drive shaft 11 may also be gathered if desired. It will be appreciated that the collected data represents the raw instantaneous values of the individual performance characteristics of the drive shaft 11. As the drive shaft 11 is continued to be rotated during use, a data base of such raw instantaneous values may be acquired over a period of time.

The raw data may be stored in the first RAM 76 and the second RAM 77 for later use. Alternatively, the data may be processed by the microprocessor 71 into more readily usable and compact format before storage in the first RAM 76 and the second RAM 77. The microprocessor 71 includes an internal clock for calculating time-based parameters, such as rotational speed (revolutions per minute), time-at-level for torque, and the like. For example, the torque data may be processed by the microprocessor 71 in accordance with a conventional rainflow-counting algorithm stored in the program ROM 75. The results of this analysis may then be stored in the first RAM 76 or the second RAM 77 as a two-dimensional histogram of rainflow-counted ranges and mean values. This type of analysis has been useful in studying fatigue in mechanical members in general.

As mentioned above, the high signal on the WAKE-UP line 401 is continuously generated by the second delay flip-flop 409 once the drive shaft 11 begins to rotate. This high signal continues to be generated even after the drive shaft 11 subsequently stops rotating. The drive shaft 11 may cease to rotate for a relatively short period of time (such as when the vehicle is momentarily stopped at a red light) or for a relatively long period of time (such as when the vehicle is parked). In the former instance, it is desirable to keep the control circuit 70 in the active operating condition because the data acquisition process will re-start imminently. In the latter instance, it is desirable to change the operating condition of the control circuit 70 to the stand-by mode in order to conserve the energy stored in the battery pack 204.

In order to determine whether to automatically change the operating condition of the control circuit 70 to the stand-by mode, the microprocessor 71 periodically samples the instantaneous rotational speed of the drive shaft 11. The microprocessor 71 is programmed to determine whether the drive shaft 11 has been not rotated for longer than a predetermined period of time. If the rotational speed of the drive shaft 11 is zero for longer than this predetermined period of time, then it is presumed that the vehicle is parked and, therefore, will not be used again for a relatively long time. Three minutes has been found to represent a satisfactory value for this predetermined period of time, although any convenient period of time may be selected. Thus, when longer than three minutes has passed with the rotational speed of the drive shaft 11 equal to zero, the microprocessor generates a high signal on the SHUTDOWN line to the reset input of the second delay flip-flop 409.

In response thereto, the high signal on the WAKE-UP line 401 is returned to low, where it remains until the drive shaft 11 is subsequently rotated. When the signal on the WAKE-UP line 401 changes from high to low, the transistors 305 and 310 are turned off, thereby decreasing the switched voltage V(SW) to zero and decreasing the stand-by voltage V(SB) to the relatively low regulated voltage. Accordingly, the control circuit 70 is automatically returned to the dormant stand-by operation condition. When the drive shaft 11 subsequently begins to rotate, the control circuit 70 is re-activated into the active operating condition as described above. The operating condition of the control circuit 70 can be repeatedly switched between the active and stand-by modes in this manner to conserve the power stored in the battery pack 204.

During the time when the control circuit 70 is in the active operating condition, the microprocessor 71 repeatedly checks the value of the LOVOLT signal on the line 302. So long as that signal is low, the voltage level supplied by the battery pack 204 is sufficient to operate the control circuit 70. Therefore, the microprocessor 71 continues to gather data in the normal manner. When a high LOVOLT signal is detected by the microprocessor 71, the voltage level supplied by the battery pack 204 is insufficient to reliably operate the components of the control circuit 70. Thus, in response to such high signal, the microprocessor 71 immediately generates the SHUTDOWN signal on the line 402 to place the control circuit 70 in the stand-by condition. This conserves whatever power is left in the battery pack 204, while still maintaining the reliability of the data which has been thus far gathered by the instrument 10 and stored in the first RAM 76 and the second RAM 77. Of course, if the high LOVOLT signal is generated when the control circuit 70 is already in the stand-by operating condition, the AND gate 407 in the wake-up sub-circuit 400 prevents the second delay flip-flop 409 from generating the high WAKE-UP on the line 401 to activate the control circuit into the active operating condition, as described above.

After the drive shaft 11 has been in use on the vehicle for a sufficient period of time to gather a desired amount of data, the instrument 10 may be connected to the external computer (not shown) or other device through the cable connector 59 so that the data stored in the control circuit 70 may be transferred therefrom for printing in hard copy form or for further evaluation. The instrument 10 does not necessarily have to be removed from within the drive shaft 11 to accomplish this. However, the drive shaft 11 is preferably maintained in a non-rotating condition to prevent the cable connector 59 from being wound up. To begin the data transfer process, the previously moved electrical switch 57 carried on the switch bulkhead 58 is again manipulated so as to move the movable arms of the switches 203 and 410 in engagement with the respective "ON" contacts. In the power supply sub-circuit 200, the battery pack 204 is continued to be connected to supply the supply voltage Vs on the line 205. If desired, an external power source (not shown) may be connected to the line 205 through the cable connector 59 to prevent further use of the battery pack 204 during the transfer of the data.

In the wake-up sub-circuit 400, the movement of the arm of the switch 410 to the "ON" contact causes the supply voltage Vs to be connected to one of the inputs of the parity generator 405. Such connection causes the output state of the parity generator 405 to change state from low to high, much the same as if one of the liquid mercury switches 403 had been closed because of rotation of the drive shaft 11. Consequently, a high signal is generated on the WAKE-UP line 401 to return the control circuit 70 to the active operating condition, as described above. Since the drive shaft 11 does not normally rotate during the data transfer process, the movement of the arm of the switch 410 is necessary to trigger the control circuit 70 to change from the stand-by operating condition into the active operating condition, despite the lack of such rotation of the drive shaft 11.

The movement of the arm of the switch 410 also causes a high signal to be generated on the "ON" line to the microprocessor 71. The presence of this signal indicates to the microprocessor 71 that the instrument 10 is to be maintained in the active operating condition despite the lack of rotation of the drive shaft 11 for longer than the predetermined period of time. Therefore, the microprocessor 71 may communicate with the external computer through the cable connector 59 for any length of time without automatically returning to the stand-by operation condition. The software required to support such communication is stored in the program ROM 75. During the data transfer process, the data stored in the first RAM 76 and the second RAM 77 may be transferred to the external computer, allowing them to be cleared for further use.

In accordance with the provisions of the patent statutes, the principle and mode of operation of the present invention have been explained and illustrated in its preferred embodiment. However, it must be understood that the present invention may be practiced otherwise than as specifically explained and illustrated without departing from its spirit or scope.

What is claimed is:

1. In an instrument including a control circuit, a battery pack for supplying power to the control circuit, and a generator for generating electrical current to re-charge the battery pack, a means for regulating the amount of electrical current supplied to the battery pack for re-charging comprising:

means for generating a signal representing the desired amount of the re-charging current, said desired signal generating means including a plurality of individual current signal sources and means for summing all of said individual current signals to provide said desired current signal;

means for generating a signal representing the actual amount of the re-charging current; and means responsive to said desired and actual current signals for controlling said actual amount of said re-charging current to correspond to said desired amount of said re-charging current.

2. The invention defined in claim 1 wherein said means responsive to said desired and actual current signals includes an operational amplifier for generating a signal representing the difference between said desired and actual current signals.

3. The invention defined in claim 2 wherein said means responsive to said desired and actual current signals further includes a pulse width modulator connected to said operational amplifier for generating a pulse train output signal therefrom, said pulse width modulator being responsive to said difference signal for varying the width of the pulses generated in said pulse train output signal.

4. The invention defined in claim 3 wherein said means responsive to said desired and actual current signals further includes a switching regulator connected between said pulse width modulator and the battery pack, and wherein the generator is connected to said switching regulator such that said switching regulator generates an output signal which is proportional to the magnitude of the electrical current generated by the generator, the amount of said proportion being determined by the length of said pulses divided by the period of time between successive pulses.

5. The invention defined in claim 1 wherein each of said individual current signal sources includes a voltage source, a resistor, and means for selectively connecting said voltage source to said resistor to generate its respective individual current signal.

6. The invention defined in claim 5 wherein each of said means for selectively connecting includes a transistor.

7. The invention defined in claim 6 further including a microprocessor connected to each of said transistors for controlling the generation of said individual current signals.

8. The invention defined in claim 7 wherein each of said transistors has a collector connected to its respective voltage source, an emitter connected to its respective resistor, and a base connected to said microprocessor.

9. The invention defined in claim 5 wherein the values of each of said resistors is different.

10. The invention defined in claim 1 wherein one of said individual current signal sources includes a voltage source, a resistor, and means for selectively connecting said voltage source to said resistor to selectively generate a first individual current signal, and wherein another of said individual current signal sources includes a voltage source directly connected to a resistor to generate a second individual current signal.

11. The invention defined in claim 10 wherein said means for selectively connecting includes a transistor.

12. The invention defined in claim 11 further including a microprocessor connected to said transistor for controlling the generation of said first individual current signal.

13. The invention defined in claim 12 wherein said transistor has a collector connected to said voltage source, an emitter connected to said resistor, and a base connected to said microprocessor.

14. The invention defined in claim 10 wherein the values of each of said resistors is different.

* * * * *